US005096247A

United States Patent [19]

Killen

[11] Patent Number: 5,096,247

[45] Date of Patent: Mar. 17, 1992

[54] HYDRAULIC SNUBBER FOR GRAPPLE EQUIPPED HYDRAULIC FLUID SUPPLY SYSTEM

[75] Inventor: John R. Killen, Banks, Oreg.

[73] Assignee: ESCO Corporation, Portland, Oreg.

[21] Appl. No.: 641,932

[22] Filed: Jan. 16, 1991

[51] Int. Cl.[5] ............................ B66C 1/00; F16F 7/04

[52] U.S. Cl. .................................. 294/119.4; 188/83; 188/367

[58] Field of Search ..................... 294/86.4, 88, 119.4; 37/183 R; 188/83, 352, 366, 367, 381; 403/15, 31, 113, 120, 146; 414/626, 732-735, 738-740

[56] References Cited

U.S. PATENT DOCUMENTS 4,723,639 2/1988 Hungerford ................. 294/119.4 X 4,810,020 3/1989 Powell ............................ 294/119.4

*Primary Examiner*—Johnny D. Cherry

*Attorney, Agent, or Firm*—Banner, Birch, McKie & Beckett

[57] ABSTRACT

A hydraulic supply system for a snubber including spaced check valves in the snubber housing supply passage and a relief passage connected to the supply passage between the check valves.

6 Claims, 2 Drawing Sheets

HYDRAULIC SNUBBER FOR GRAPPLE EQUIPPED HYDRAULIC FLUID SUPPLY SYSTEM

BACKGROUND AND SUMMARY OF INVENTION

This invention relates to a hydraulic snubber for a grapple and, more particularly, to a snubber including a hydraulic fluid supply system for an internally provided piston which assists in the snubbing action between the snubber housing and the associated clevises.

This invention is an improvement on co-owned U.S. Pat. No. 4,810,020 and reference may be had thereto for details of construction and operation not specifically set forth herein. Generally, the grapple of the '020 patent has been employed in the skidding of logs and required freedom of movement in two mutually perpendicular planes. However, when the grapple was free, it required snubbing against free pivotal movement; otherwise, it could cause injury to logging personnel and damage to the grapple itself by crashing into the boom.

The '020 patent provided an internal ring piston for the hydraulic snubber and employed a special grease inlet fitting to protect against excessive external pressure so as to minimize the chance of undesired leakage and also to restrict the degree of snubbing. However, this required a special adapter assembly to prevent use of a grease gun with a standard ("automotive") type nozzle. While the adapter assembly worked well, there have been customer complaints about using it—to the extent that some customers refused to use it. That meant that there was no overload protection for the springs—resulting in flattening of the springs and loss of the object of the snubber. According to the invention, this disadvantage has been overcome. More specifically, the need for a special adapter assembly has been avoided—and without sacrificing overload protection.

According to the invention, the single check valve fitting which was incorporated into the snubber housing passage communicating with the annular piston groove has been replaced by a pair of spaced apart check valves defining a chamber therebetween. The outer check valve allows hydraulic fluid to be introduced through a standard automotive type grease gun. Connecting the chamber with the housing exterior is a pressure relief passage equipped with a pressure relief valve.

BRIEF DESCRIPTION OF DRAWINGS

The invention is described in conjunction with an illustrative embodiment in the accompanying drawing, in which.

DETAILED DESCRIPTION

Figure 1:
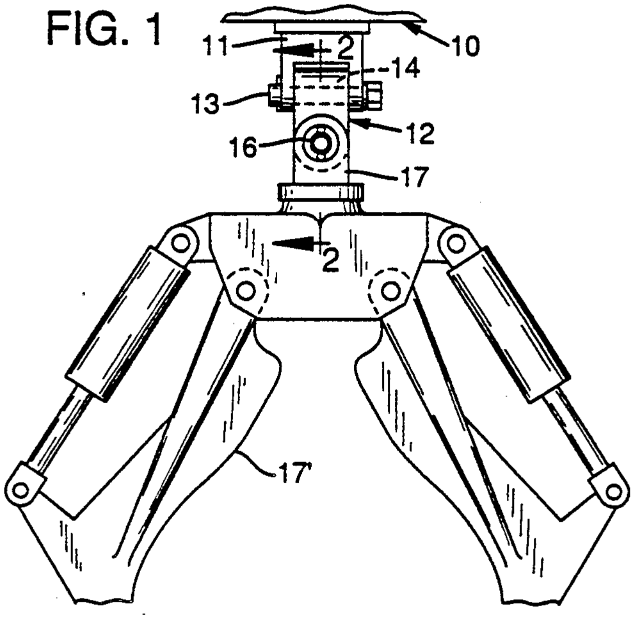
FIG. 1 is a fragmentary elevational view of a skidding grapple.

In the illustration given and with reference first to FIG. 1, the numeral 10 designates generally a boom which is shown only in fragmentary form. It will be appreciated that the basic environment of the snubber is well known and therefore details may be omitted. Depending from the boom 10 is a clevis 11 which supports a housing generally designated 12.

Figure 2:
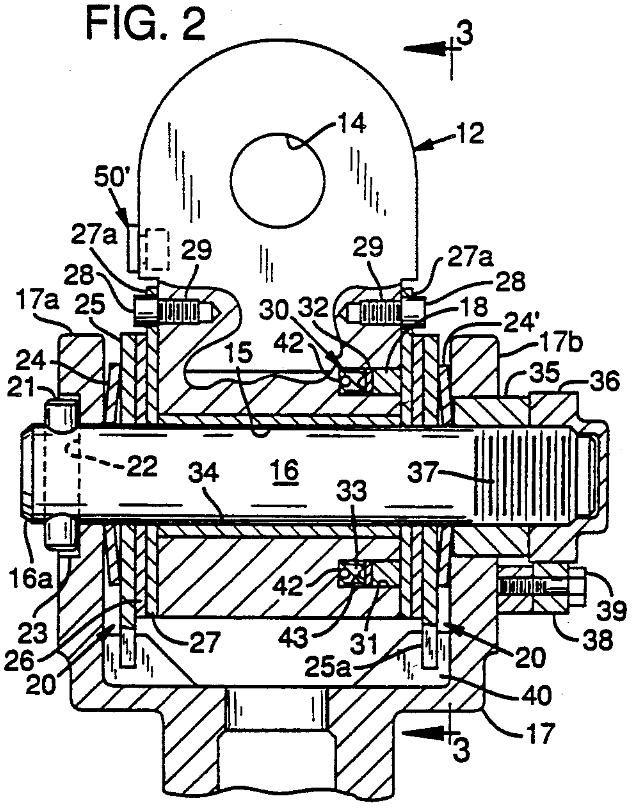
FIG. 2 is a fragmentary sectional view such as would be seen along the sight line 2—2 of FIG. 1.

More particularly, the clevis 11 rotatably supports a shaft 13 which extends through a through bore 14 in the housing 12—see also the upper portion of FIG. 2.

The housing 12 has a lower through bore 15—see the central portion of FIG. 2 which again supports a through shaft 16. The shaft 16 in turn is mounted within the grapple clevis 17 (again, see FIG. 2 in the lower portion thereof). In turn, the clevis 17 is fixed to a grapple 17'. The details of the grapple are not pertinent to this invention except insofar as the grapple provides a environment where control and swinging is desired.

Operation Generally

Referring again to FIG. 2, the numeral 18 designates an internal ring piston which is urged to the right by virtue of hydraulic pressure fluid introduced through the grease inlet fitting means generally designated 19. This compresses a pair of snubber assemblies generally designated 20 interposed between the housing 12 and the clevis 17—see the lower right and left hand corners of FIG. 2. More particularly, the compression or clamping of the snubber assembly 20 prevents rotation between the relative parts thereof so as to inhibit free rotation.

Extending through the through bore 15 is the shaft 16 and which is rotatably received within the grapple clevis 17. Fixing the shaft 16 against movement to the right, i.e., movement of the left hand end **16*a* toward the housing 12 is a pin 21 extending through an opening 22 and which is received against the exterior of the left hand leg 17*a*. More particularly, as can be seen from FIG. 2, the left hand leg 17*a* has a counter-sunk opening as at 23 in which the pin 21** is received.

Proceeding inwardly from the left hand leg **17*a*, i.e., toward the housing 12, the snubber assembly 20 includes a Belleville spring 24, a disc retainer 25, a split friction disc 26 and a wear plate 27. These elements 24–27 are ensleeved on the shaft 16** with appropriate center openings being provided.

An identical friction assembly is provided between the housing and the right hand leg **17*b* of the clevis 17** as can be appreciated from a consideration of the right hand portion of FIG. 2.

Rotation of the wear plates 27 is restricted by virtue of an integral flanged part as at **27*a* (see the left hand portion of FIG. 2) through which bolts 28 extend into openings as at 29 in the housing 12**.

As mentioned previously, the piston is provided on only one side of the housing and this is again designated 18 in the right hand portion of FIG. 2. The ring piston 18 is part of a ring piston assembly generally designated 30 and which is received within an annular groove 31.

The ring piston assembly includes in proceeding serially inward, the ring piston 18, a contaminant exclusion ring 32 and a seal 33. The annular groove 31 extends only partway into the housing. Within the through bore 15, a bushing 34 is provided around the shaft 16 (see the central portion of FIG. 2).

Completing the right hand portion of the assembly on the shaft 16 is a tension spacer 35 which abuts the Belleville spring 24' and a nut 36 which is threadably received on the right hand end of the shaft 16—as on the threads 37, these shown in the lower central portion of FIG. 2. Completing the assembly is a nut locking mechanism 38, 39 seen in the lower right hand corner of FIG. 2.

Also seen in the lower right hand corner of FIG. 2 in the clevis 17 is an integral lug 40 which engages a slot provided in the integral extension 25*a* of the disc retainer 25.

In operation, it will be seen that when the ring piston 18 moves to the right, it compresses both the right hand and the left hand friction assemblies 20 so that the non-rotatable elements, i.e., the disc retainers 25 and the wear plates 27, engage the friction discs 26 and inhibit rotation between the housing 12 and the clevis 17.

Figure 4:
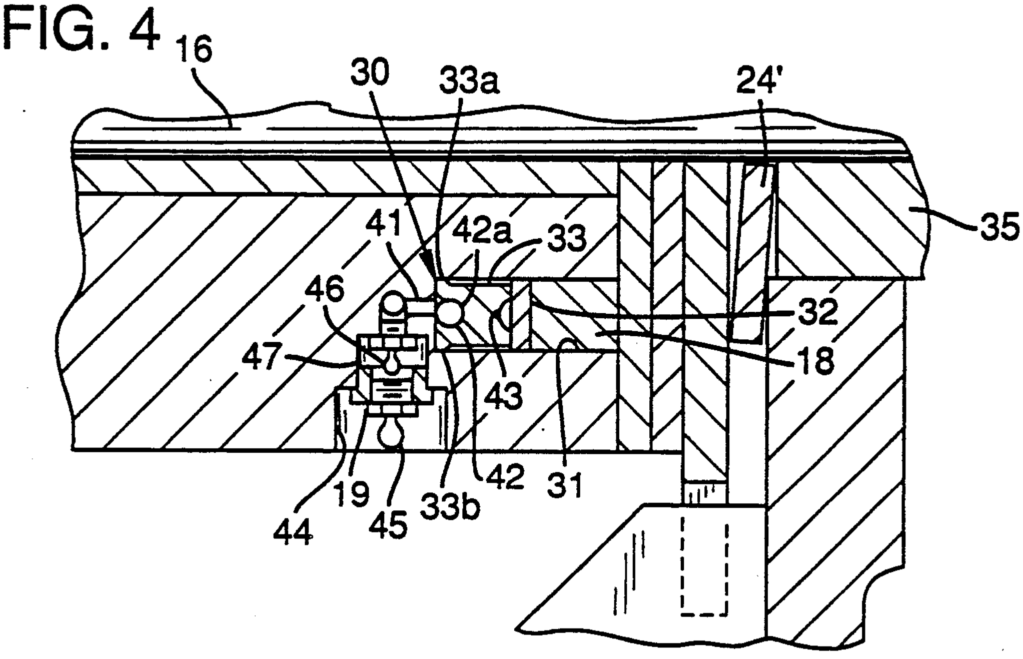
FIG. 4 is an enlarged fragmentary sectional view of the housing taken along the sight line 4—4 of FIG. 3.

Referring to FIG. 4 it will be seen that the grease inlet fitting means 19 communicates with a branch fluid passage 41 which in turn communicates with the annular bore 31. Through this, pressure fluid engages the left hand face of the annular seal 33 which is enlarged at the left hand end by virtue of having an expanded ring 42 mounted within a groove 42*a* therein. This provides a linear or line type seal between the inner and outer perimeter of the seal 33 and the inner wall of the annular bore 31. Additionally, a groove is provided in the outer face as at 43. This develops an annular bearing between the outer or right hand face of the seal 33 and the exclusion ring 32.

The Hydraulic Fluid Supply System

Figure 3:
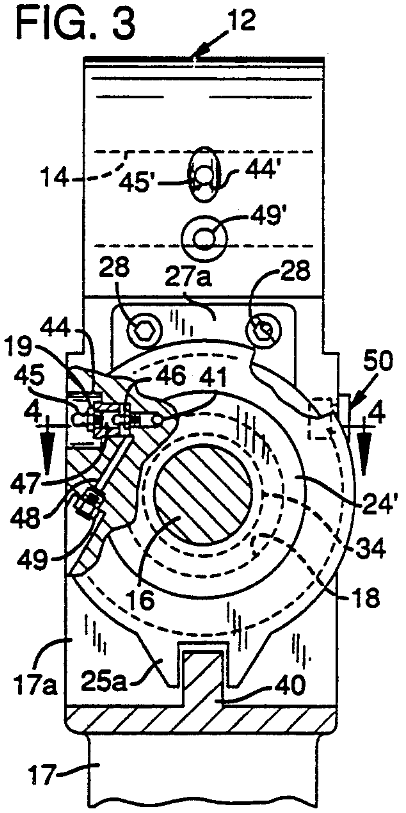
FIG. 3 is a side elevational view such as would be seen along the sight line 3—3 of FIG. 2 and with a portion in section.

Referring first to FIG. 3, the inlet fitting means 19 for hydraulic fluid, i.e., grease, is mounted in a passage generally designated 44 which , at the outer end (left, as seen) communicates with the exterior of the housing 12. At its inner end (right, as seen in FIG. 3), the passage 44 communicates with the piston ring bore 31 via the branch fluid passage 41 (see the central portion of FIG. 4).

Threadably mounted in the passage 44 in spaced relation therealong are two check valves 45 and 46. These are separated by a chamber 47 and permit fluid flow only into the piston ring bore 31. Thus, grease in the chamber 47 is at the same pressure as that in the bore 31.

When grease is introduced into the system 44–47 and 41, the possibility of over pressure exists and this is relieved by a relief passage 48 in which is mounted a relief valve 49. Normally, the relief valve is set to a predetermined pressure— usually in the range of 1000–2000 psi, say 1500 psi, for example. If grease is introduced to bring the pressure above 1500 psi, the relief valve opens and grease escapes. This gives a visual signal to the operator that the system is properly charged. Assisting in this respect is the fact that the passages 44, 48 are vertically aligned, i.e., the relief valve 49 of fitting means 19 is closely adjacent to the outer check valve 45, see FIG. 5.

Preferably, two systems are employed—as indicated in FIG. 3 where the second system is installed in the position designated 44' to snub rotation about the shaft 14. As seen in FIG. 3, the inlet and outlet are on the reverse side of the housing 12 from those shown in FIG. 5.

Figure 5:
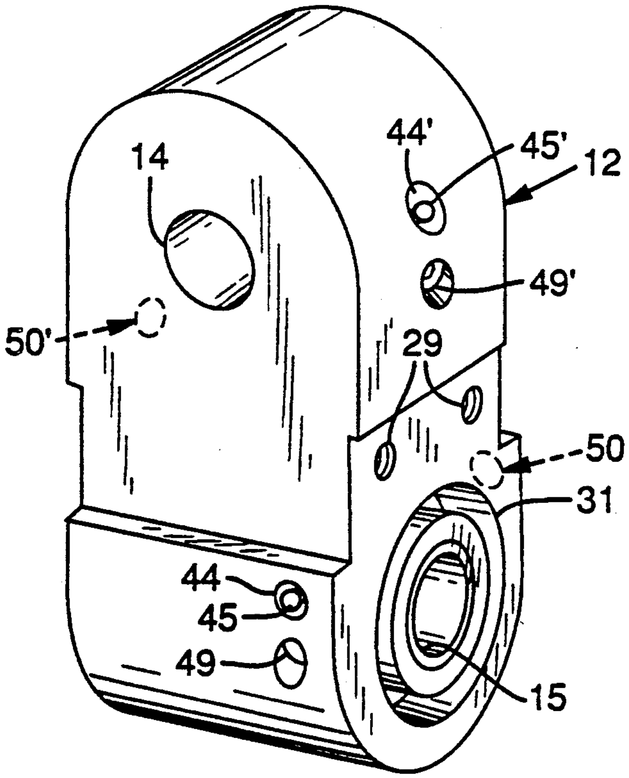
FIG. 5 is a perspective view of the snubber housing.

Also, I provide an air-bleed for initial charging of both systems as at 50 and 50' in FIGS. 3 and 5. Advantageously, this may take the form of a port closed by a No. 3 SAE plug. The fittings 45 and 45' are advantageously Alemite Catalog Nos. 1610. The fitting 46 and its second system counterpart (not shown) have a smaller profile and may be Alemite Catalog No. 1641B. A variety of relief valves 49 and 49' (see FIG. 5) may be employed but I prefer Alemite Catalog No. 305550.

In summary, the internal pressure relief is an enhancement to the existing grease adjusted snubber marketed by ESCO Corporation of Portland, Oregon. By incorporating two additional threaded ports (each end of the snubber) that are connected by an internally cross-drilled passage, grease is allowed to enter the piston annular bore. Four additional fittings are assembled to allow grease to be injected through a standard automotive type lube fitting. The early snubber required a special adapter to mate to a pin type lube fitting. This external adapter, which also incorporated the pressure relief, has been eliminated.

The grease injected through the outer lube fitting 45 then passes through another internally mounted lube fitting 46, then into the piston chamber 31. The inner lube fitting 46 traps the grease and resultant pressure, acting as a check valve.

As the snubber is being energized with grease, the relief fitting 49 will allow the system to relieve at a predetermined working pressure. Visible grease at the relief fitting indicates the proper operating pressure has been achieved.

During normal operation, external loadings create forces on the snubber piston significantly increasing the internal pressure, exceeding the normal operating or relief pressure. The inner relief fitting, acting as a pressure check, keeps the excess pressure contained, thus not passing out the relief fitting 49. The relief fitting relieves only the initial static injection of grease at working pressure.

Thus, the system is impervious to pressure "spikes", i.e., temporary increases in pressure in the bore 31 due to shock loads, etc. This stems from the fact that the inner check valve 46 prevents outflow of pressure fluid from the bore 31 and isolates the relief passage 48 therefrom.

While in the foregoing specification a detailed description of an embodiment of the invention has been set down for the purpose of illustration, many variations in the details hereingiven may be made by those skilled in the art without departing from the spirit and scope of the invention.

I claim:

1. A hydraulic snubber for a clevis-equipped boom suspending a clevis-equipped grapple comprising:
   - a housing equipped with an annular groove having an inner end and an internal ring piston assembly therein; and a friction assembly including a back-up plate compressible by pressure fluid induced movement of said piston assembly,
   - said ring piston assembly including in proceeding serially inwardly a ring piston, a contaminant exclusion ring and a pressure seal,
   - a hydraulic pressure fluid supply passage in said housing connecting said inner end of said annular groove to the housing exterior,
   - spaced apart inner and outer hydraulic check valves in said supply passage defining a chamber therebetween whereby fluid injected into said passage is applied to said seal to move said ring piston outwardly against said friction assembly and inhibit rotation between said housing and an adjacent clevis,
   - a pressure relief passage in said housing connecting said chamber to the housing exterior, a pressure relief valve in said pressure relief passage arranged to pass pressurized hydraulic supply fluid when a predetermined pressure is applied thereto, said seal including an annulus having inner and outer grooved faces, an expander O-ring in the groove of said inner face forcing a perimetric portion of said seal into linear sealing engagement with the walls of said annular groove, the groove of said outer face providing an annular bearing between said seal outer face and said back-up plate to stabilize said perimetric portion in linear sealing relation to said annular groove.

2. The hydraulic snubber of claim 1 in which said outer check valve is a lubrication fitting.

3. The hydraulic snubber of claim 1 in which said pressure relief valve has a predetermined pressure of the order of about 1000 psi to about 2000 psi.

4. The hydraulic snubber of claim 1 in which said supply and relief passages are arranged to provide adjacent openings in said housing for visual ascertainment of proper pressurizing.

5. A hydraulic snubber for a clevis-equipped boom suspending a clevis-equipped grapple comprising:

a housing having an upper through bore and a lower through bore extending perpendicularly to said upper bore, an upper pivot shaft in said upper bore for pivotal mounting in said boom clevis and a lower pivot shaft in said lower bore for pivotal mounting in said grapple clevis whereby said grapple is adapted to pivot in two mutually perpendicular vertical planes relative to said boom, each shaft being equipped with a pin at one end external to its associated clevis to prevent each shaft from moving axially toward said housing, each shaft at its other end being equipped with a tension spacer mounted in said associated clevis and a threaded nut to tension said shaft within said associated clevis.

each shaft other end between its associated clevis and said housing being equipped with a friction assembly including in proceeding serially inwardly a Belleville washer, a disc retainer, a split friction disc and a wear plate, said housing adjacent said other shaft end being equipped with an outwardly facing annular groove about said shaft and extending only partly inwardly into said housing, said groove having an inner end, a ring piston assembly in said annular groove including in proceeding serially inwardly a ring piston, an exclusion ring and a seal, said seal including an annulus having inner and outer grooved faces, an expander O-ring in the groove of said inner face forcing a perimetric portion of said seal into linear sealing engagement with the walls of said annular groove, the groove of said outer face providing an annular bearing between said seal outer face and said exclusion ring to stabilize said perimetric portion in linear sealing relation to said annular groove, a hydraulic pressure fluid supply passage in said housing connecting said inner end of said annular groove to the housing exterior, hydraulic fluid check means in said passage whereby fluid injected into said passage is applied to said seal to move said ring piston outwardly against said friction assembly and inhibit rotation between said housing and the adjacent clevis, said check means including spaced apart hydraulic check valve means defining a chamber therebetween, a pressure relief passage in said housing connecting said chamber to the housing exterior, and a pressure relief valve in said pressure relief passage arranged to pass pressurized hydraulic supply fluid when a predetermined pressure is applied thereto to provide a visible sign that said annular groove is suitably pressured.

6. A hydraulic snubber for a clevis-equipped boom suspending a clevis-equipped grapple comprising:

a housing having an upper through bore and a lower through bore extending perpendicularly to said upper bore, an upper pivot shaft in said upper bore for pivotal mounting in said boom clevis and a lower pivot shaft in said lower bore for pivotal mounting in said grapple clevis whereby said grapple is adapted to pivot in two mutually perpendicular vertical planes relative to said boom, each shaft being equipped with a pin at one end external to its associated clevis to prevent each shaft from moving axially toward said housing, each shaft at its other end being equipped with a tension spacer mounted in said associated clevis and a threaded nut to tension said shaft within said associated clevis, each shaft other end between its associated clevis and said housing being equipped with a friction assembly including in proceeding serially inwardly a Belleville washer, a disc retainer, a split friction disc and a wear plate, said housing adjacent said other shaft end being equipped with an outwardly facing annular groove about said shaft and extending only partly inwardly into said housing, said groove having an inner end, a seal-equipped ring piston assembly in said annular groove and pressure fluid supply and relief passage means in said housing connecting said inner end of said annular groove with the exterior of said housing to provide a pressure fluid inlet and a pressure relief outlet adjacent said pressure fluid inlet, said passage means including a supply passage equipped with spaced apart, inner and outer serially-acting check valves arranged to pass pressurized fluid only toward said annular groove and defining a chamber between said check valves, said passage means including a relief passage connecting said chamber to the housing exterior and equipped with a relief valve therein.

* * * * *